(12) United States Patent
Tada et al.

(10) Patent No.: US 7,910,509 B2
(45) Date of Patent: Mar. 22, 2011

(54) DIELECTRIC PORCELAIN COMPOSITION FOR USE IN ELECTRONIC DEVICES

(75) Inventors: Tomoyuki Tada, Osaka (JP); Kazuhiro Nishikawa, Osaka (JP); Kazuya Toji, Osaka (JP); Kazuhiro Kura, Osaka (JP); Takeshi Shimada, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 613 days.

(21) Appl. No.: 11/993,722

(22) PCT Filed: Jun. 24, 2005

(86) PCT No.: PCT/JP2005/011648
§ 371 (c)(1),
(2), (4) Date: Dec. 21, 2007

(87) PCT Pub. No.: WO2006/137152
PCT Pub. Date: Dec. 28, 2006

(65) Prior Publication Data
US 2010/0167908 A1    Jul. 1, 2010

(51) Int. Cl.
*C04B 35/465* (2006.01)
(52) U.S. Cl. ...................................... 501/136
(58) Field of Classification Search .................... 501/136
See application file for complete search history.

(56) References Cited

U.S. PATENT DOCUMENTS

| 5,356,844 A | * | 10/1994 | Hirahara et al. | 501/136 |
| 6,025,291 A | * | 2/2000 | Murakawa | 501/136 |
| 6,613,707 B2 | * | 9/2003 | Choi et al. | 501/136 |

FOREIGN PATENT DOCUMENTS

| JP | 2625074 | 4/1997 |
| JP | 2002-274939 | 9/2002 |
| JP | 2004-91266 | 3/2004 |
| JP | 2005-194112 | 7/2005 |
| RU | 2 242 442 C1 | 12/2004 |

OTHER PUBLICATIONS

Machine translation of JP 2004091266, Mar. 2004.*
International Search Report issued in PCT/JP2005/011648 on Aug. 16, 2005.
English abstract for RU 2242442 (Dec. 20, 2004).

* cited by examiner

*Primary Examiner* — Karl E Group
(74) *Attorney, Agent, or Firm* — Stein McEwen, LLP

(57) ABSTRACT

The invention intends to provide a dielectric porcelain composition for use in electronic devices, in which the relative dielectric constant ∈r is high, the Qf value is high and, the temperature coefficient τf can be controlled while maintaining the temperature coefficient τf at the resonant frequency small and the Qf value high. According to the invention, when, in an $LnAlO_3$—$CaTiO_3$-based dielectric porcelain composition, a molar ratio of $LnAlO_3$ and $CaTiO_3$ is optimized and Al is substituted by a slight amount of Ga, a structure that has an $LnAlO_3$—$CaTiO_3$ solid solution as a main phase and a solid solution of Al—Ga-based oxide as a secondary phase and does not substantially contain $\alpha$-$Al_2O_3$ in the structure can be obtained, and the temperature coefficient τf can be controlled while maintaining the temperature coefficient τf at the resonant frequency small and the Qf value high.

4 Claims, 8 Drawing Sheets

Al ⊢——⊣10um

DIELECTRIC PORCELAIN COMPOSITION FOR USE IN ELECTRONIC DEVICES

CROSS-REFERENCE TO RELATED APPLICATIONS

This application claims the benefit of PCT International Patent Application No. PCT/JP2005/011648, filed Jun. 24, 2005, and is related to Japanese Patent Application No. 2003-435566, filed Dec. 26, 2003, in the Japanese Patent Office, the disclosures of which are incorporated herein by reference.

TECHNICAL FIELD

The invention relates to a dielectric porcelain composition used in communication devices such as resonators, oscillators, circuit boards and so on in microwave and millimeter wave regions, that is, a dielectric porcelain composition for use in electronic devices, which forms a sintered body containing an $LnAlGaO_3$—$CaTiO_3$ solid solution as a main phase and a solid solution of Al—Ga-based oxide as a secondary phase and is capable of controlling the temperature coefficient τf while maintaining a temperature coefficient τf at the resonant frequency small and the Qf value high.

BACKGROUND ART

A dielectric porcelain composition is widely used in a high frequency region such as microwave or millimeter wave. As the characteristics required for these various applications, the followings can be cited. That is, (1) since a wavelength is shortened to $1/\in r^{1/2}$ in a dielectric material, the relative dielectric constant ∈r is large in order to achieve miniaturization, (2) the dielectric loss in a high frequency region is small, that is, the Qf value is high, and (3) the temperature coefficient τf at a resonant frequency is small and stable.

Furthermore, it is important as well that the temperature coefficient τf is controllable in a predetermined range.

As such a dielectric porcelain composition for use in a high frequency region, many materials have been proposed. For instance, $LnAlO_3$—$CaTiO_3$-based dielectric porcelain (see patent literature 1) shows various dielectric characteristics depending on the composition thereof, and the characteristics such that, in a range where the relative dielectric constant ∈r is in the range of from 30 to 47, the Qf value is in the range of from 10,000 to 58,000 (value at 1 GHz) are obtained. However, although the Qf value is relatively high, the relative dielectric constant ∈r is low and the temperature coefficient τf is not so small; accordingly, there remains a problem in the application as practical devices.

In order to overcome the problems of the above-mentioned material, $(1-x)Nd(Ga_{1-y}Al_y)O_3$-$xCaTiO_3$-based dielectric porcelain (see patent literature 2) has been proposed. This material has $NdGaO_3$—$CaTiO_3$ as a base composition, and when Ga is partially substituted by Al, the characteristics such that the relative dielectric constant ∈r is 45 or more and the Qf value is 43,000 or more are obtained, and the temperature coefficient τf can be controlled by varying a substation amount of Al.

Patent literature 1: Japanese Patent No. 2,625,074
Patent literature 2: JP-A-2002-274939

DISCLOSURE OF THE INVENTION

Problem that the Invention is to Solve

However, since the Qf value of the $(1-x)Nd(Ga_{1-y}Al_y)O_3$-$xCaTiO_3$-based dielectric porcelain material decreases with an increase in Al, there is a problem in that, the temperature coefficient τf cannot be controlled while maintaining the Qf value to be high. Furthermore, since expensive Ga is used a lot, there is an economical problem in that it induces an increase of the material cost.

The invention intends to overcome the above-mentioned problems that the conventional dielectric porcelain composition for use in high frequency has and to provide at low cost a dielectric porcelain composition for use in electronic devices, in which the relative dielectric constant ∈r is high, the Qf value is high, and the temperature coefficient τf can be controlled while maintaining the temperature coefficient τf at the resonant frequency small and the Qf value high.

Means for Solving the Problem

The inventors have made intensive studies with focusing on controlling the temperature coefficient τf while maintaining the temperature coefficient τf small and the Qf value high. As a result of intensive studies, it has been found that, when, in an $LnAlO_3$—$CaTiO_3$-based dielectric porcelain composition, a molar ratio of $LnAlO_3$ and $CaTiO_3$ is optimized and Al is slightly substituted by Ga, the above-mentioned object can be achieved.

Furthermore, the inventors have found that, the dielectric porcelain composition, in which a molar ratio of $LnAlO_3$ and $CaTiO_3$ is optimized, contains an $LnAlGaO_3$—$CaTiO_3$ solid solution as a main phase and a solid solution of Al—Ga-based oxide as a secondary phase, and $\alpha\text{-}Al_2O_3$ is not substantially present in the structure, whereby completing the invention.

That is, the invention provides:

a dielectric porcelain composition for use in electronic devices, which has a compositional formula represented by $xLn(Al_{1-y}Ga_y)O_3\text{-}(1-x)CaTiO_3$ wherein Ln represents at least one kind of rare earth elements, wherein x and y in the compositional formula each satisfy the following values:

$$0.22 \leq x \leq 0.37, \text{ and } 0 < y \leq 0.1.$$

Furthermore, the invention also relates to dielectric porcelain compositions for use in electronic devices, in each of which, in the dielectric porcelain composition having the above-mentioned structure, a) a structure that contains an $LnAlGaO_3$—$CaTiO_3$ solid solution as a main phase and a solid solution of Al—Ga-based oxide as a secondary phase, or b) a structure where $\alpha\text{-}Al_2O_3$ is not substantially present therein.

Advantage of the Invention

According to the invention, the dielectric porcelain composition for use in electronic devices has the relative dielectric constant ∈r in the range of from 44 to 45 and the Qf value of equal to or more than 48,000, and the temperature coefficient τf at the resonant frequency thereof can be controlled in the range of from −2 to +2 ppm/° C.

Furthermore, according to the invention, the Qf value of the $LnAlO_3$—$CaTiO_3$ base dielectric porcelain composition for use in electronic devices can be increased by partially substituting Al by a slight amount of Ga.

BEST MODE FOR CARRYING OUT THE INVENTION

In the dielectric porcelain composition according to the invention for use in electronic devices, when a molar ratio of LnAlO₃ and CaTiO₃ is optimized and Al is substituted by a slight amount of Ga, the temperature coefficient τf can be controlled while maintaining the temperature coefficient τf at the resonant frequency small and the Qf value high. Reasons for limiting Ln as well as x and y that show ranges of the respective components are as follows.

In the invention, as the Ln, at least one kind of rare earth elements can be used and Nd is most preferred. A particle size of a rare earth oxide powder as a raw material thereof is in the range of from 0.5 to 5 μm and preferably in the range of from 1 to 3 μm. In particular, when a rare earth oxide powder having a fine particle size is used as a raw material, advantages of the invention such as high relative dielectric constant ∈r, high Qf value and the controllability of the temperature coefficient τf can be further improved.

In the above, x represents a component range of $Ln(Al_{1-y}Ga_y)O_3$ and $CaTiO_3$ and is preferably in the range satisfying $0.22 \leq x \leq 0.37$. When it is less than 0.22, the temperature coefficient τf becomes unfavorably larger in a positive side and, when it exceeds 0.37, the temperature coefficient τf becomes unfavorably larger in a negative side.

Then, y represents a component range of Al and Ga and is preferably in the range satisfying $0 < y \leq 0.1$. When it exceeds 0.1, the Qf value unfavorably decreases. A further preferable range thereof is $0.02 \leq y \leq 0.08$.

The dielectric porcelain composition according to the invention, which has the above-mentioned composition, contains an $xLn(Al_{1-y}Ga_y)O_3$-$(1-x)CaTiO_3$ solid solution phase and a solid solution phase of Al—Ga-based oxide. It is considered that the peculiar constitutional phase contributes to advantages peculiar to the invention.

That is, the dielectric porcelain composition according to the invention, when Ga is not contained, is composed of an LnAlO₃—CaTiO₃ phase alone or an LnAlO₃—CaTiO₃ phase and an α-Al₂O₃ phase and does not contain a solid solution phase of Al—Ga-based oxide. In this case, as will be shown in examples described below, it is obvious as well from that both the relative dielectric constant ∈r and the Qf value are low in comparison with a case where Al is partially substituted by Ga and a solid solution phase of Al—Ga-based oxide is present.

Whether a solid solution phase of Al—Ga-based oxide is present or not can be confirmed by an EPMA analysis of a sintered body of the dielectric porcelain composition. As the results of the EPMA analysis, it is confirmed that α-Al₂O₃ is not substantially present in the porcelain composition of the invention.

In the dielectric porcelain composition of the invention, an average grain diameter is preferably in the range of from 12 to 17 μm and particularly preferably in the range of from 14 to 17 μm. The Qf value can be improved by controlling the average grain diameter in the preferable range.

The dielectric porcelain composition of the invention can be readily produced by obtaining a sintered body according to known methods in which the respective processes such as blending of raw material powders, wet or dry mixing, drying, calcination, wet or dry pulverization, drying, granulation, molding and sintering and the respective devices are appropriately selected.

EXAMPLES

Example 1

As starting raw materials, high purity powders of Nd₂O₃, Al₂O₃, Ga₂O₃, CaCO₃ and TiO₂ were prepared. In this regard, Nd₂O₃ powder having an average particle size of 1 μm, Al₂O₃ powder having an average particle size of 1.5 μm, and TiO₂ powder having an average particle size of 1.7 μm were used, respectively.

The respective powders were blended so as to satisfy $0.3Nd(Al_{1-y}Ga_y)O_3$-$0.7CaTiO_3$ (y=0, 0.02, 0.04, 0.06, 0.08 or 0.10), followed by mixing in pure water and subsequent drying. Then, the mixed powders were calcined at temperature in the range of 1100 to 1300° C. for 4 hr depending on the compositions thereof. Calcined powders thus obtained were pulverized to average particle sizes in the range of from 0.8 to 2.0 μm, followed by drying the pulverized powders.

In the next place, PVA was added to and then mixed with the dried powder, followed by granulating with a granulating device. The granulated powder thus obtained was molded to the mold density in the range of from 2.5 to 3.5 g/cm³ with a uniaxial press machine. The green compact thus obtained was removed of a binder at a temperature in the range of from 300 to 700° C., followed by sintering in the atmosphere at a temperature in the range of from 1400 to 1600° C. for 2 to 10 hr to obtain a sintered body.

The sintered body thus obtained was processed into a size of φ 10 mm×5 mm to obtain a test piece. The test piece thus obtained was measured in terms of the relative dielectric constant ∈r, Qf value and the temperature coefficient τf by the use of a network analyzer according to a H & C method.

In FIG. 1, measurement results of the relative dielectric constant ∈r are shown. It is found that the relative dielectric constant ∈r is increased by partially substituting Al by Ga. Furthermore, it is found that the dielectric porcelain composition of the invention shows such a high relative dielectric constant ∈r of from 44 to 45.

In FIG. 2, measurement results of the Qf value are shown. It is found that the Qf value is increased by partially substituting Al by Ga, and in particular, it is most increased at 6% substitution. Furthermore, the dielectric porcelain composition of the invention is found to show such a high Qf value of from 48,500 to 49,500 GHz.

FIG. 3 shows measurement results of the temperature coefficient τf. It is found that the temperature coefficient τf varies in the range of from −2 to about +2 ppm/° C. with zero at a center, by partially substituting Al by Ga.

As obvious from FIGS. 1 through 3, it is found that, by partially substituting Al by Ga, the temperature coefficient τf of the dielectric porcelain composition of the invention can be controlled without lowering the Qf value. Furthermore, the Qf value can be increased by controlling a substitution amount of Ga.

In FIG. 4, measurement results of average grain diameters are shown. The average grain diameter was measured in accordance with a linear intercept method. It is found that the average grain diameter is in the range of from 12 to 16 μm. When the average grain diameter is controlled in the range of from 12 to 16 μm, excellent dielectric characteristics as shown in FIGS. 1 through 3 can be obtained.

In FIG. 5, relationship between the average grain diameter depending on Ga substitution amount and the Qf value is shown. Similarly to results of FIG. 2, it is found that at 6% substitution, the highest Qf value can be obtained. Furthermore, from the results, it is found that, when the average particle diameter is controlled in the predetermined range, stable Qf value can be obtained.

Example 2

In FIG. 6, results of EPMA analysis of a test piece of $0.3Nd(Al_{1-y}Ga_y)O_3$-$0.7CaTiO_3$ (y=0.06) in Example 1 are shown. An upper left portion shows BEI (composition image, a schematic diagram is shown in FIG. 7); an upper center portion shows a characteristic X-ray image of Al (a schematic diagram is shown in FIG. 8); an upper right portion shows a characteristic X-ray image of Ga (a schematic diagram is shown in FIG. 9); a lower left portion shows a characteristic X-ray image of Ti (a schematic diagram is shown in FIG. 10); a lower center portion shows a characteristic X-ray image of Ca (a schematic diagram is shown in FIG. 11); and a lower right portion shows a characteristic X-ray image of Nd, respectively.

In a composition image in an upper left portion, a portion seen white (in a schematic diagram of FIG. 7, a portion surrounded by a thin black line over an entire base portion) is an $xLn(Al_{1-y}Ga_y)O_3$-$(1-x)CaTiO_3$ solid solution phase that is a main phase, and a grey portion (in the schematic diagram, a portion surrounded by a heavy black line and a heavy black line) is a solid solution phase of Al—Ga-based oxide (grains are partially removed).

In characteristic X-ray images of Al and Ga, portions same as grey portions in a composition image (within line frames of schematic diagrams in FIGS. 8 and 9) are white and in characteristic X-ray images of Ti, Ca and Nd, portions same as grey portions in a composition image (within line frames of schematic diagrams in FIGS. 10 and 11) are black. That is, it is found that, in the grey portions in the composition image, Ti, Ca and Nd are not present and only Al or Ga-based oxides are present to form a solid solution phase of Al—Ga base oxide.

Furthermore, since white portions in the characteristic X-ray image of Al and white portions in the characteristics X-ray image of Ga substantially overlap each other, it is considered that Al is hardly present solely. Accordingly, in the porcelain composition of the invention, $\alpha$-$Al_2O_3$ is not substantially present.

INDUSTRIAL APPLICABILITY

According to the invention, a dielectric porcelain composition for use in electronic devices, which has such excellent dielectric characteristics as that the relative dielectric constant $\in r$ is 44 to 45, the Qf value thereof is 48,000 or more and the temperature coefficient $\tau f$ thereof at the resonant frequency can be controlled in the range of from −2 to +2 ppm/° C. can be obtained, and miniaturization and high performance recently demanded for portable terminal electronic devices and so on can be thus achieved.

Figure 1:
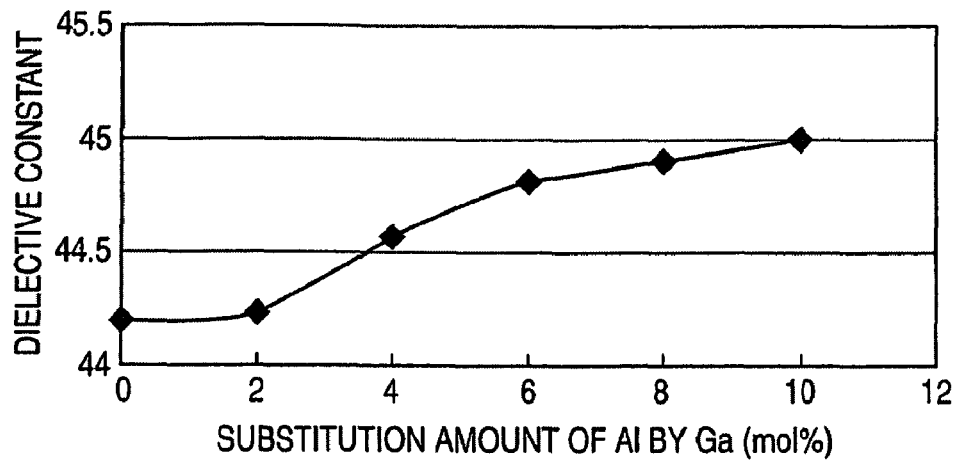
FIG. 1 is a graph showing relationship between the relative dielectric constant $\in r$ of a dielectric porcelain composition of the invention and a substitution amount of Al by Ga.
Figure 2:
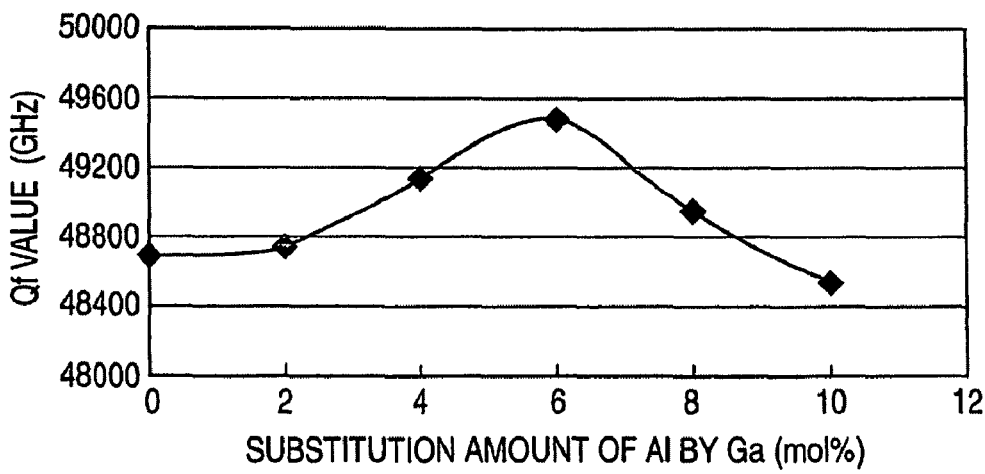
FIG. 2 is a graph showing relationship between the Qf value of a dielectric porcelain composition of the invention and a substitution amount of Al by Ga.
Figure 3:
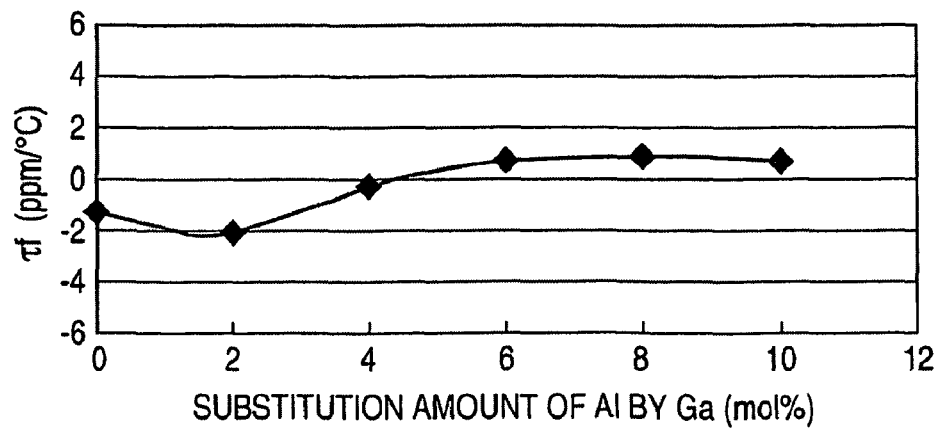
FIG. 3 is a graph showing relationship between the temperature coefficient $\tau f$ at the resonant frequency of a dielectric porcelain composition of the invention and a substitution amount of Al by Ga.
Figure 4:
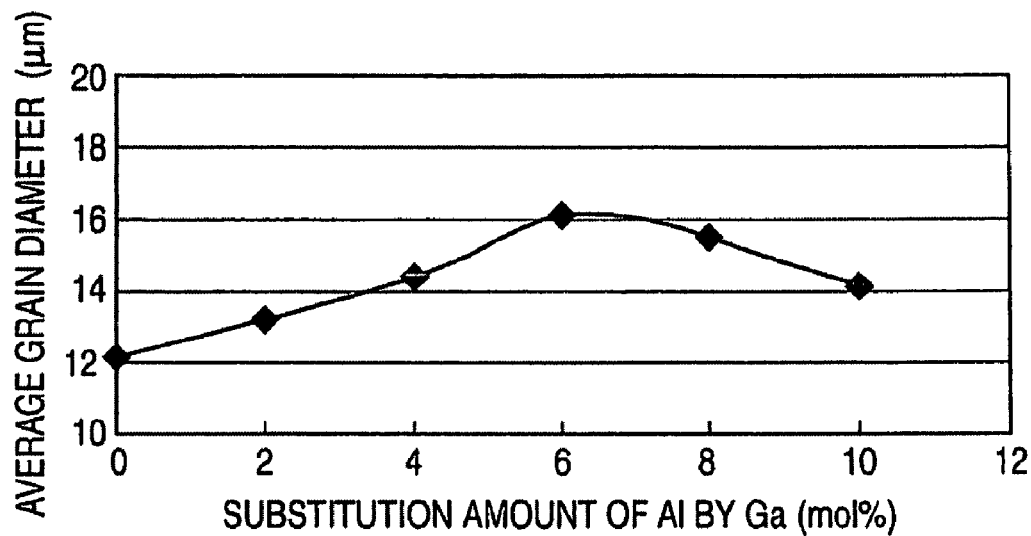
FIG. 4 is a graph showing relationship between the average grain diameter of a dielectric porcelain composition of the invention and a substitution amount of Al by Ga.
Figure 5:
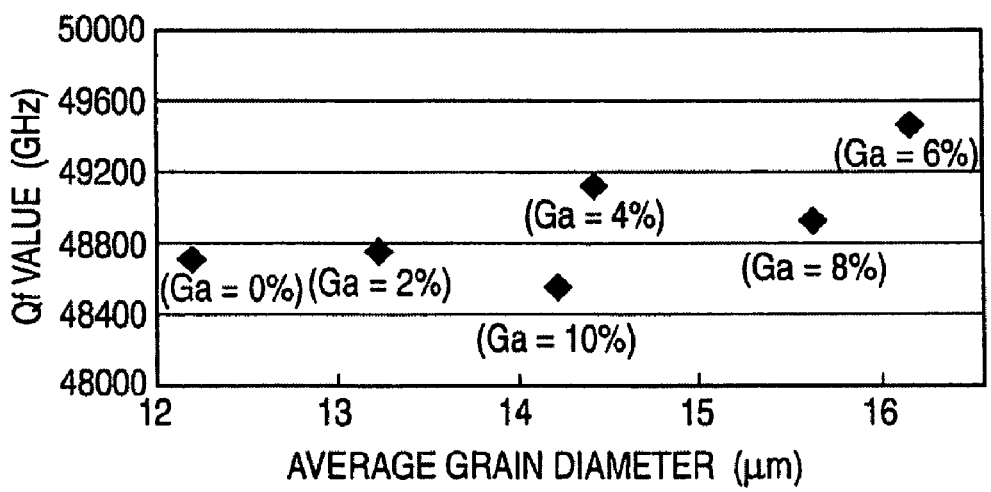
FIG. 5 is a graph showing relationship between an average grain diameter and the Qf value of the dielectric porcelain composition of the invention.
Figure 6:
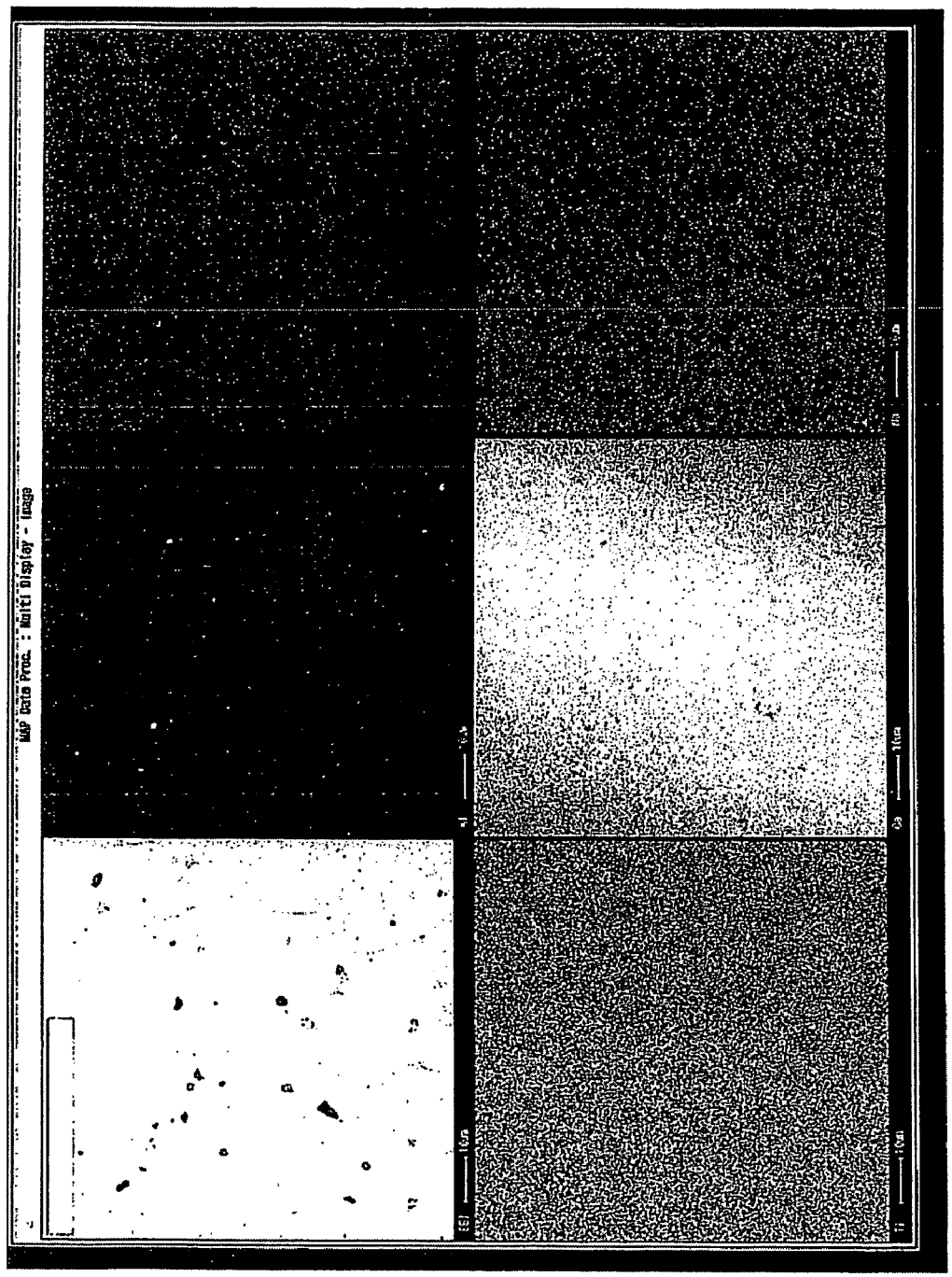
FIG. 6 is a diagram of a composition image and characteristic X-ray images showing EPMA analysis results of the dielectric porcelain composition of the invention.
Figure 7:
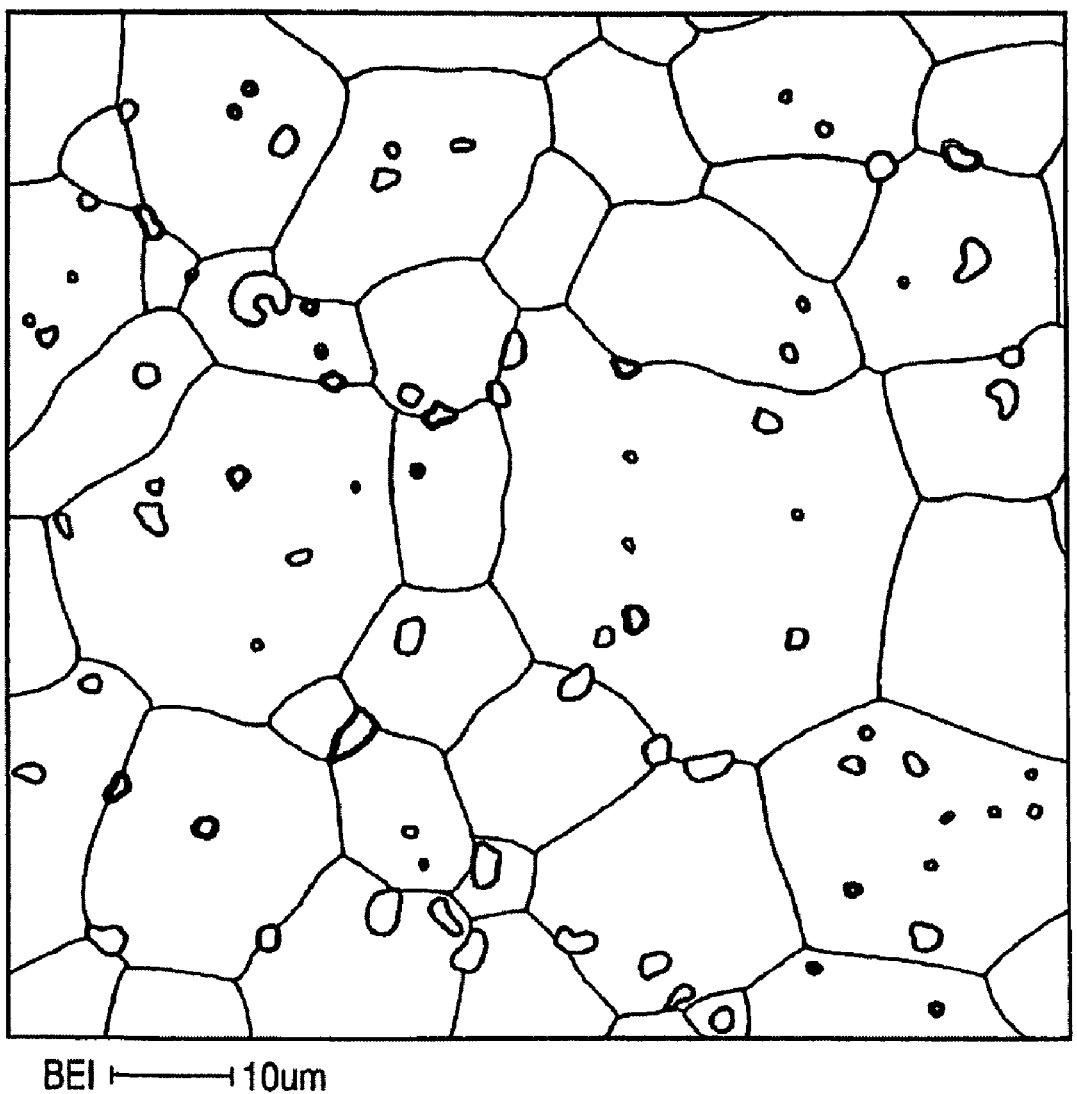
FIG. 7 is a schematic diagram showing BEI (composition image) of FIG. 6.
Figure 8:
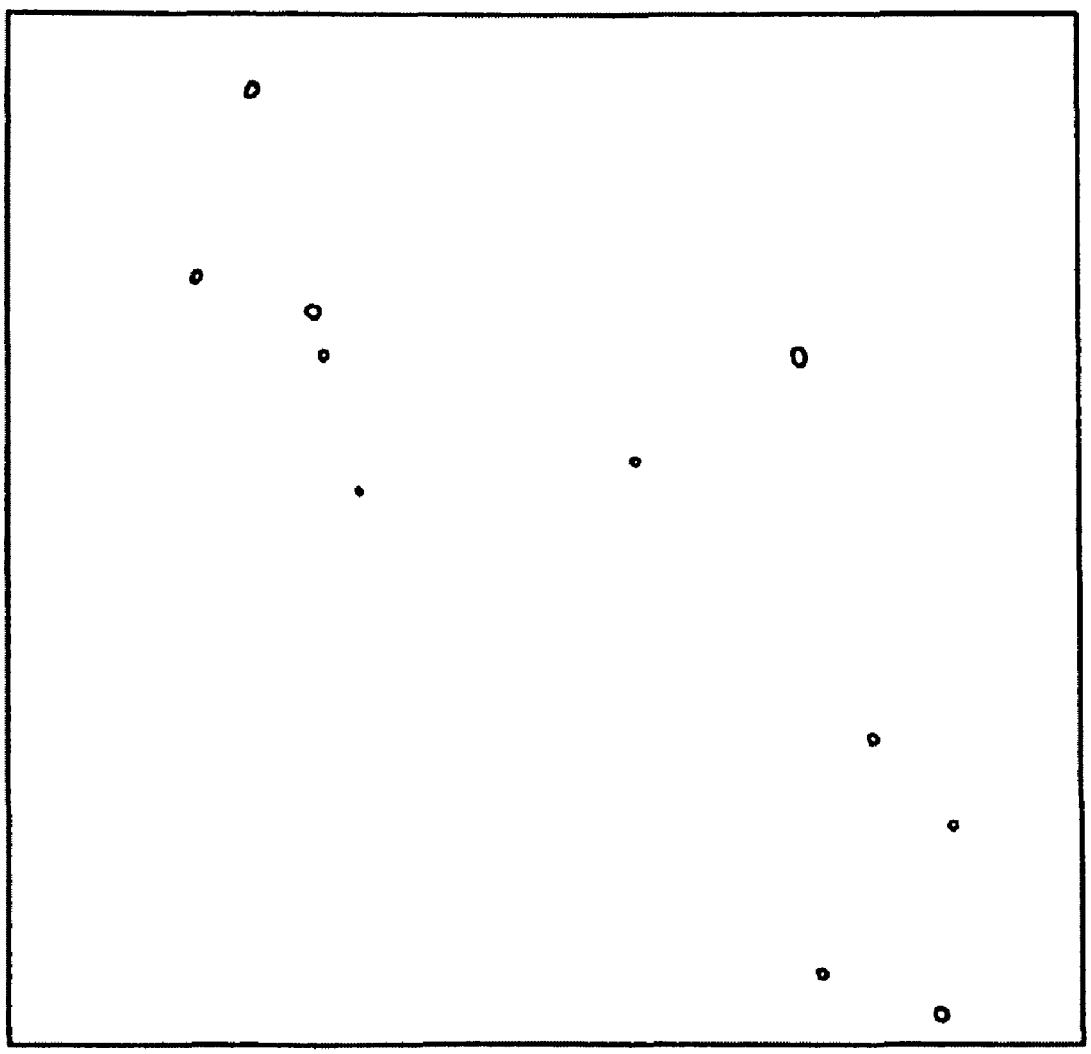
FIG. 8 is a schematic diagram showing a characteristic X-ray image of Al of FIG. 6.
Figure 9:
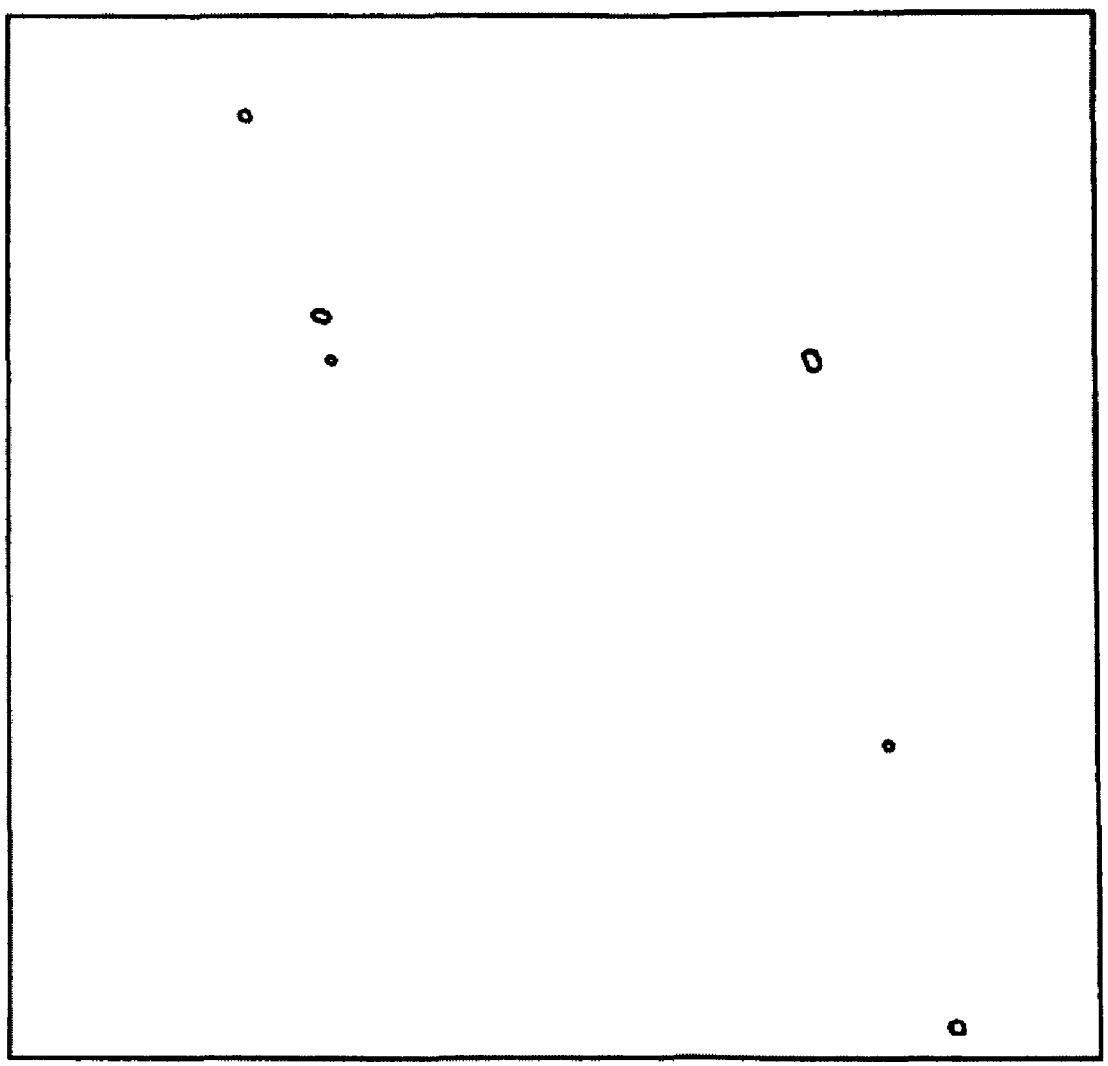
FIG. 9 is a schematic diagram showing a characteristic X-ray image of Ga of FIG. 6.
Figure 10:
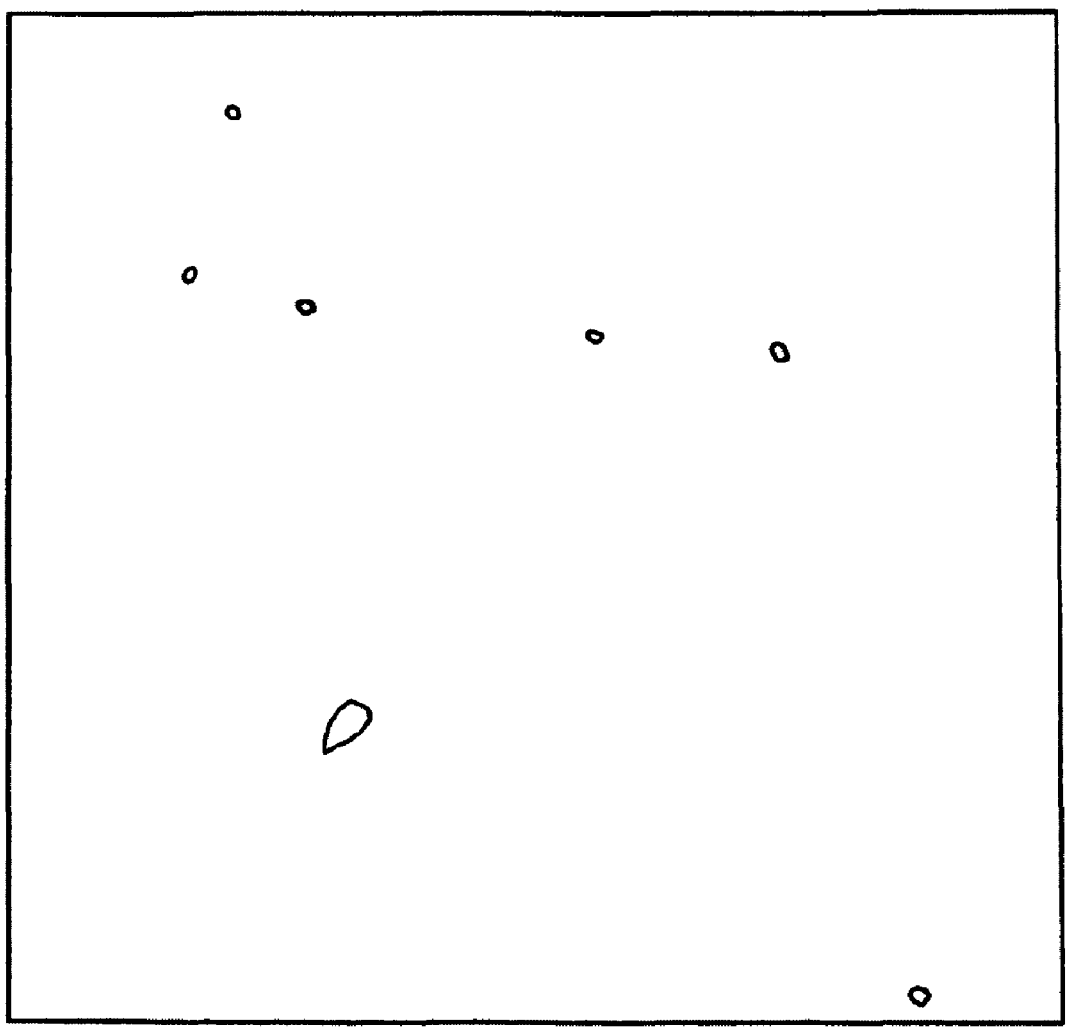
FIG. 10 is a schematic diagram showing a characteristic X-ray image of Ti of FIG. 6.
Figure 11:
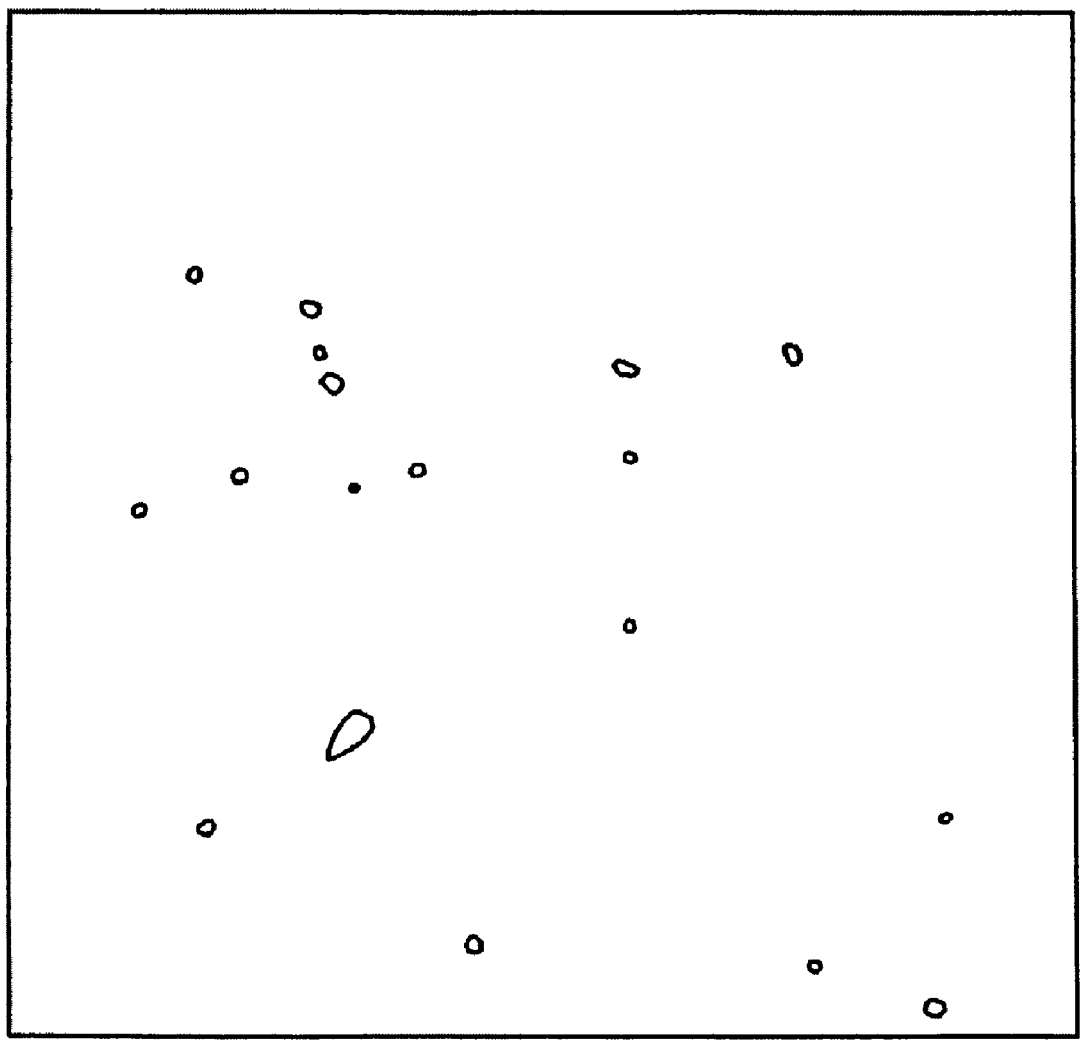
FIG. 11 is a schematic diagram showing a characteristic X-ray image of Ca of FIG. 6.

The invention claimed is:

1. A dielectric porcelain composition for use in electronic devices, which has a compositional formula represented by $xNd(Al_{1-y}Ga_y)O_3$-$(1-x)CaTiO_3$
   wherein x and y in the compositional formula each satisfy the following values:
   $0.22 \leq x \leq 0.37$, and
   $<y<0.1$.

2. The dielectric porcelain composition for use in electronic devices according to claim 1, said composition comprising a $NdAlGaO_3$—$CaTiO_3$ solid solution as a main phase and a solid solution of Al—Ga oxide as a secondary phase.

3. The dielectric porcelain composition for use in electronic devices according to claim 2, wherein $\alpha$—$Al_2O_3$ is not substantially present therein.

4. The dielectric porcelain composition for use in electronic devices according to claim 1, wherein y in the compositional formula satisfies the following value:
   $0.2 \leq y \leq 0.8$.

* * * * *